(12) United States Patent
Martinez et al.

(10) Patent No.: US 8,331,727 B2
(45) Date of Patent: Dec. 11, 2012

(54) METHOD FOR MAKING MOSAICS

(76) Inventors: Vicente Atares Martinez, Zaragoza (ES); Alberto S. Atares Sigmund, Zaragoza (ES); Daniel V. Atares Sigmund, Zaragoza (ES)

( * ) Notice: Subject to any disclaimer, the term of this patent is extended or adjusted under 35 U.S.C. 154(b) by 645 days.

(21) Appl. No.: 12/530,414

(22) PCT Filed: Jan. 25, 2008

(86) PCT No.: PCT/ES2008/000040
§ 371 (c)(1),
(2), (4) Date: Oct. 9, 2009

(87) PCT Pub. No.: WO2008/110639
PCT Pub. Date: Sep. 18, 2008

(65) Prior Publication Data
US 2010/0104190 A1   Apr. 29, 2010

(30) Foreign Application Priority Data

Mar. 15, 2007   (ES) .................................. 200700693

(51) Int. Cl.
*G06K 9/36*   (2006.01)
*G06K 9/46*   (2006.01)
(52) U.S. Cl. ........................................ 382/284; 382/190
(58) Field of Classification Search .................. 382/276, 382/284, 286, 291, 100, 190
See application file for complete search history.

(56) References Cited

U.S. PATENT DOCUMENTS 5,568,391 A    10/1996 McKee
5,913,992 A *  6/1999 Gerber ............................ 156/64
6,380,938 B1 * 4/2002 Ngan ............................. 345/440
2002/0057458 A1   5/2002 Davis et al.
2002/0154143 A1  10/2002 Maier

FOREIGN PATENT DOCUMENTS

DE     195 14 132 A1    10/1996
EP     0 829 378 A2      3/1998
FR     2681557 A1        3/1993
WO     2005075216 A1     8/2005

* cited by examiner

*Primary Examiner* — Yon Couso
(74) *Attorney, Agent, or Firm* — Hultquist, PLLC; Steven J. Hultquist

(57) ABSTRACT

The method optimizes the process of making mosaics, in terms of the quality and similarity of the image that is produced, making it possible to work manually, semi-automatically or fully automatically with optimum results. This is achieved by analyzing each of the pieces that make up the tesserae according to a large number of parameters, including the existence of marks and their position in the pieces, and assigning a storage location to each of them. Computer software is used to divide the image to be depicted into graphic units, the characteristics of which are also analyzed, comparing them with the available pieces and assigning the most similar piece thereto according to the available pieces and within a tolerance range. The final appearance of the mosaic is then displayed, it being possible to make changes to the assignation of pieces manually if necessary. Said software then assigns the exact position of each piece in the mosaic to be formed, based on the storage position of said pieces. The pieces are then glued in place by any conventional means.

12 Claims, 3 Drawing Sheets a)

b)

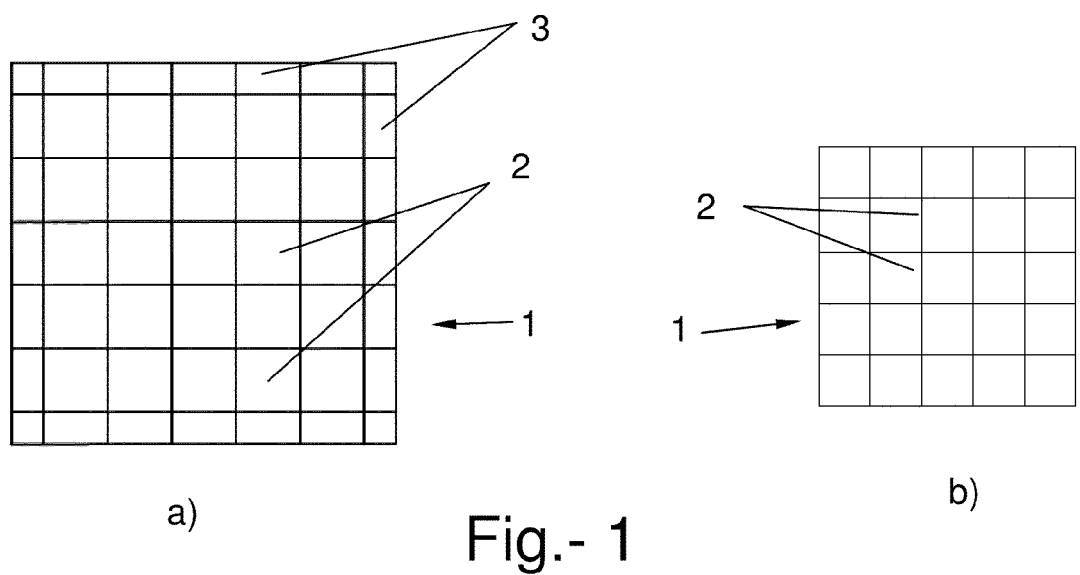
Fig.- 1
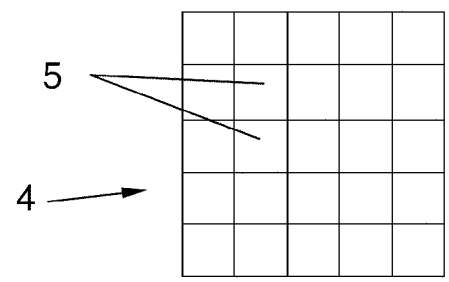
Fig.- 2
```
1 1 1 0 0
1 1 0 0 0
1 0 0 0 0
0 0 0 0 0
0 0 0 0 0
```
Fig.- 3

| a) | b) | c) | d) |
|---|---|---|---|
| 1 1 1 0 0 | 0 0 1 1 1 | 0 0 0 0 0 | 0 0 0 0 0 |
| 1 1 0 0 0 | 0 0 0 1 1 | 0 0 0 0 0 | 0 0 0 0 0 |
| 1 0 0 0 0 | 0 0 0 0 1 | 0 0 0 0 1 | 1 0 0 0 0 |
| 0 0 0 0 0 | 0 0 0 0 0 | 0 0 0 1 1 | 1 1 0 0 0 |
| 0 0 0 0 0 | 0 0 0 0 0 | 0 0 1 1 1 | 1 1 1 0 0 |

Fig.- 6

METHOD FOR MAKING MOSAICS

CROSS-REFERENCE TO RELATED APPLICATIONS

This application is a U.S. national phase under the provisions of 35 U.S.C. §371 of International Application No. PCT/ES08/00040 filed Jan. 25, 2008, which in turn claims priority of Spanish Patent Application No. P200700693 filed Mar. 15, 2007. The disclosures of such international application and Spanish priority application are hereby incorporated herein by reference in their respective entireties, for all purposes.

BACKGROUND OF THE INVENTION

1. Technical Field of the Invention

The present invention relates to a novel method for making mosaics from an image.

The object of the invention is to provide a procedure that improves the process of making said mosaics, in terms of the quality and similarity to the original of the mosaic image that is produced, making it possible to work manually, semi automatically or fully automatically on said process with optimum results.

The invention lies within the field of art, decoration, architecture, construction and even furniture.

2. State of the Art

Usually, mosaics are made practically by hand, so the artist or craftsperson visually selects the coloured tesserae that best fit the picture to be created, as well as the positioning thereof, which requires great skill by said craftsperson and involves the use of very specialised labour, with the drawbacks that this involves in terms of costs.

Attempts to overcome this problem have led to known industrial processes for making mosaics wherein the image to be produced is digitally processed to produce an image according to the size of the tesserae to be used.

An example of this type of methods can be seen in the publication of American patent application U.S. 2002/0154143, which discloses a method for depicting a mosaic image on the surface of an object. This method comprises the following steps: (a) generating digital data corresponding to a first image, the motif image of the mosaic, by means of computer capturing (scanning) and image editing software, (b) creating a model using a plurality of cells (grid or lattice) that in turn contain a plurality of shades corresponding to shade values contained in corresponding areas of the first image, (c) depicting or applying the model on the surface of the object, and (d) creating a mosaic by covering the model with pieces of material (tesserae), said pieces of material having a range of shades corresponding to the plurality of shades contained in the cells of the grid.

However, this existing method continues to apply traditional methods that it would be desirable to automate and optimise, such as applying the image model to the surface to be decorated, placing the pieces of material onto said surface and, in particular, making a detailed study of the tesserae of the material that is to be used to make the mosaic. Likewise, aspects such as the quality of the mosaic that is produced, its definition and its similarity to the original photo still offer results that are far from optimum.

DESCRIPTION OF THE INVENTION

The method for making mosaics proposed by the invention provides an entirely satisfactory solution to the aforementioned problem, providing a fully automated and optimised procedure in terms of quality, definition and similarity of the mosaic that is produced, which nevertheless allows the user to modify the results obtained at a stage prior to the final assembly of the mosaic.

To achieve this the method proposed herein begins at a prior stage of preparation of the material to be used, wherein any conventional system is used to cut the materials wherefrom to make the tesserae that determine the mosaic, such as stone, marble, pottery, granite, wood, glass, plastic, paper and suchlike, which may be broken up into both regular and irregular shapes.

The available material is then analysed, either together or separately, using an optical capturing process, by means of a digital camera or by scanning, so that computer software can be used to record the characteristics of each tessera, including size, shape, colour, colour components, any marks that it might have, uniformity of the colour, and other characteristics that differentiate them from each other.

Having analysed the available tesserae, their characteristics are saved in a database, wherein the exact storage place of each piece will also be saved in an organised, structured manner, so that each tessera is located in a single predetermined place in the database. As an exception, if many similar tesserae are repeated, they may all be stored in the same deposit, saving said location in the databases.

In the following step of the procedure the image to be reproduced using tesserae is analysed.

Said image, which is acquired using a digital camera or any electronic optical means, such as a scanner or suchlike, or from an image design program, may be digitally processed using any graphic design software and it may be modified, so that once the image to be created using tesserae has the final appearance and size, it is processed by computer software that divides it into pieces according to the shapes of the available tesserae. Said software assigns the colour, shape, marks, etc., to each graphic unit whereinto the image has been subdivided according to the colour or colours, shape, marks, etc., which were originally established on said image.

The data relating to each graphic unit that has been generated, such as its shape, colour and position within the image as a whole, are finally saved in a database.

The following step consists of using said computer software to compare the data relating to each graphic unit whereinto the image is divided with the different tesserae that are available in the database, assigning to each graphic unit a tessera with values that coincide or acceptably coincide within a previously established tolerance range.

Said computer software will generate a preliminary image of the final appearance of the mosaic with the tesserae assigned, so that by means of said software the user can manually modify the design according to the tesserae available in the database. Obviously, this replacement is saved in said database.

Once the user is satisfied with the mosaic that is to be produced, the software will indicate the position of each tessera on the working or configuration plane of the mosaic, in addition to previously indicating the place where said tessera is saved and updating the database with regard to the stocks of materials and completed graphic units.

Said mosaic composition process based on the positioning data for each tessera may be carried out automatically with the aid of robots, semi-automatically or completely by hand, without this affecting the essential nature of the method of the invention.

Lastly, it should be mentioned that any conventionally known means can be used to glue in place each of the tesserae that make up the mosaic.

The invention also provides an apparatus that comprises the necessary means of putting the aforementioned method into practice, such as a means of preparing and analysing the material and photograph, a means of storing data, a means of comparing data, a means of generating a preliminary image, a means of automatically assigning the position of the tesserae and a means of handling and fixing the tesserae.

This and other aspects of the invention are achieved using a method according to claim 1, an apparatus according to claim 8 and a computer program according to claim 9. The particular embodiments of the method that is the object of the invention are defined in dependent claims 2 to 7.

BRIEF DESCRIPTION OF THE FIGURES

These and other characteristics and advantages of the invention will be shown more clearly in the following detailed description of a preferred embodiment, which is intended only as an illustrative, non-limiting example, with reference to the attached figures.

FIG. 1 This figure shows two diagrams a) and b) that correspond to an example of how a tessera (1) is divided into sections (2) leaving out the peripheral area, and an example of how a tessera (1) is divided into sections (2), respectively.

FIG. 2 This figure shows a diagram of a section of photo (4) divided into sections (5).

FIG. 3 Shows an example of the "comparative" values of one section.

FIG. 4 Shows examples of shapes of marks according to the location of the "comparative" values.

FIG. 5 Shows examples of sizes of marks according to the amount of "comparative" values that are present in the section.

FIG. 6 Shows examples of the situation of the marks according to the corner to which the mark is closest ("comparative" values).

DETAILED DESCRIPTION OF A PREFERRED EMBODIMENT OF THE INVENTION

The following terminology will be used to provide a better understanding of this description of a preferred embodiment of the invention:

Photo: Image to be reproduced in the form of a mosaic.
Piece of photo: each of the subdivisions whereinto the image of the Photo is broken down.
Material: Product wherefrom the mosaic is made.
Tessera: Smallest physical unit whereinto the "material" is cut, and wherefrom the mosaic is made up.
Section: Graphic unit whereinto both the images of the tesserae and those of the pieces of photo are subdivided to analyse their characteristics.

The example of a preferred embodiment of the invention is explained by means of an example wherein a mosaic measuring 100×100 centimeters is made from square tesserae (1) measuring 1 $cm^2$.

To achieve this, and according to the first step of the procedure, the material that constitutes said mosaic is cut into square tesserae (1) measuring 1 $cm^2$, the cut-up tesserae (1) are photographed or scanned and analysed by computer software, so that the image obtained for each tessera is divided into sections (5×5 sections in the chosen example of embodiment), so that in the analysis of each tessera (1) the parameters thereof will be determined, e.g. the colour, its components, and any other characteristic that makes it possible to differentiate them from each other, such as marks, texture, finish, roughness, shine, etc. In the division of the tessera (1) into sections (2) it is possible not to include the surface corresponding to the outer edge (3) of said tessera (1), in order to avoid analysing irregularities or defects in the cutting. Therefore, the captured image of each tessera (1) will adjust to a resolution that is a multiple of the number of sections (2). Each of the sections (2) is assigned a colour characteristic, which will be the mean of the characteristics of all the pixels that it comprises. Thus, colour R of a specific section (2) will be the mean of all of the R components of the R pixels that form it, and likewise for the other colour components and other differentiating characteristics.

Once the values of the colour and its components R, G, B, of each section (2) are known, the mean of the values of all the sections (2) will be found, as will their greatest and lowest values, which will be used to determine, according to deviations of said values from the mean, whether a certain classification of the tessera (1) is accepted, such as uniformity, and likewise for the other colour components and other differentiating characteristics.

Said characteristics of the tessera (1) will be saved in a database, as will its storage position.

Similarly, the captured image that the mosaic is to resemble as closely as possible is altered to a suitable scale and divided into equal pieces of photo (4), which are in turn divided into sections (5) (5×5 sections in the example of embodiment), so that each graphic unit or piece of photo (4) must be represented by a number of pixels that is a multiple of the number of pixels that define the sections. Thus, a photo with 2500 pixels per side will be divided into 100 graphic units with 25 pixels per side, and each graphic unit will be subdivided into 5×5 sections with 5 pixels per side.

Said sections (5) will be analysed in a similar manner to the sections (2) of the captured images of the real tesserae (1), and they will be saved in a database associated with the image file.

First, a set of tolerances will be defined that will be used to validate the results when comparing the values. They will depend on the quality to be achieved in the final mosaic, so that the smaller the tolerance, the better will be the quality of the mosaic.

In both cases, i.e. in the analysis of the sections (5) whereinto the pieces of photo (4) are divided and the sections (2) whereinto the captured images of the available tesserae (1) are divided, it will be verified that all the values of the sections (2, 5) are within the tolerance range, wherein case it will be considered a uniform image. Otherwise, it will be considered an image with a mark, which will be treated in the following manner:

Once the values of the aforementioned parameters are known for all the sections (2, 5) and the mean values have been calculated for all of them, the value of each section (2, 5) is compared with the mean that has been calculated.

According to the result, one value or another will be assigned thereto, depending whether it is greater, the same or smaller, within a previously defined tolerance range. In the present example this value will be identified as the "comparative" value.

Therefore, in the specific case of the colour parameter, for example, a set of darker values will be identified as a "mark".

Should the values of the colour components of a section (2, 5) plus the tolerance be smaller than the values of the mean of the tessera (1), that section (2, 5) will be assigned a mark comparative value, e.g. value "1".

Should the values of the colour components of a section (2, 5) minus the tolerance be greater than the values of the mean of the tessera (1), that section (2, 5) will be assigned a different mark comparative value, e.g. value "2".

In any other case, it will be assigned a third mark value, e.g. value "0", for values close to the mean.

By doing the same for all the sections (2, 5) it is possible to produce a "map of sections" with values "0", "1" or "2". An example of a section with values "0" and "1" can be seen in FIG. 3.

Therefore, should the Tessera (1) that has been analysed have a mark, the colour value of the mark and the base of the tessera (1) are found; this is done by calculating the mean values of the colour components of the sections (2) that have the same comparative value, separately.

Moreover, a set of theoretical mark shapes are defined in said software (see FIG. 4), such as a) rectangular, b) triangular, c) square, d) type 1 irregular triangular, e) sector-specific, f) circular interiors, g) type 1 double rectangular mark, h) type 1 double rectangular and circular mark, etc., according to the location of the comparative values.

When comparing the map of sections (2) with the theoretical models, within the previously defined tolerance range, the mark shape of the tessera (1) that has been analysed is obtained.

Likewise, a set of theoretical mark sizes are defined (FIG. 5), e.g. a) small, b) medium, c) large, d) very large, etc.

When comparing the map of sections (2) with the theoretical models, within the previously defined tolerance range, the mark size of the tessera (1) that has been analysed is obtained.

The situation of the mark will be defined (FIG. 6) according to the corner to which it is closest; a) corner 1, b) corner 2, c) corner 3, d) corner 4, etc.

Having analysed the characteristics of the images of the graphic units or pieces of photo (4) of the photograph and of the tesserae (1), they are saved in their respective databases.

Both the values that have been studied and the images of the graphic units (4) of the photograph and of the tesserae (1) will be saved.

Therefore, data such as the following will be saved: record code; colour values, and colour components R, G and B; uniformity; shape, size, situation and colour of the mark; name whereunder the image is saved; characteristics of the material (type, finish, texture, etc.); Location where the tessera is stored (row, column, tray, shelf, warehouse, etc.); identity code of the graphic unit of the photograph to which the tessera has been assigned; row and column that it occupies in the photo; identity code and location of the tessera that has been assigned to the graphic unit of the photograph; Quality or tolerance range required when searching for the tessera that represents said graphic unit, etc.

Using these data and after exchange of the information from the databases, as was mentioned before, computer software is used to generate an image with the final appearance of the mosaic based on the available pieces that are most similar to the graphic units of the photograph, which may be modified by the user should it be considered necessary, thanks to the possibility of accessing the file of available material and changing certain tesserae for others, said modifications being recorded.

Therefore, once the desired mosaic has been obtained virtually, said computer software locates each of the tesserae involved in the mosaic and assigns a position to it. This process can be automatically assisted or performed manually using the indications provided by said software, and any conventional means of gluing can be used in said process.

The invention claimed is:

1. A method for making mosaics, wherein the image to be produced is digitally processed to produce an image according to the size of the tesserae to be used, which comprises the following operational steps:
   (a) Preparing the material wherefrom the tesserae that determine the mosaic are to be produced using any conventional cutting system,
   (b) Analysing the available material, by means of an optical capturing process, determining and recording the differentiating characteristics of each tessera,
   (c) Storing the analysed characteristics of each tessera in a database of available materials, and the exact storage place of each piece,
   (d) Analysing the characteristics of the image to be reproduced using tesserae, in digital format, said image being divided into fragments or pieces of photo according to the shapes of the available tesserae, and storing the data relating to each piece of photo in a database,
   (e) Comparing the data for each piece of photo whereinto the image is divided with the different tesserae available in the materials database, assigning to each piece of photo a tessera with values that coincide or acceptably coincide within a previously established tolerance range,
   (f) Generating a preliminary image of the final appearance of the mosaic with the tessera assigned, optionally manually modifying the design according to the tesserae available in the materials database,
   (g) Automatically assigning the position of each tessera on the working or configuration plane of the mosaic, in addition to previously assigning the place where said tessera is stored and updating the database with regard to the stocks of materials and completed pieces of photo, and
   (h) Gluing or fixing each of the tesserae that make up the mosaic,
   Wherein analysis steps b) and d) comprise the following operational steps in relation to the tesserae and the pieces of photo, respectively:
      (i) Dividing the captured image of each tessera and each piece of photo into sections,
      (ii) Assigning to each section of the tesserae and of the pieces of photo a color characteristic consisting of the mean of all the components of the color characteristic of the pixels that form it,
      (iii) Calculating the mean of the values of the color characteristic of all the sections and calculating the greatest and lowest values thereof,
      (iv) Determining the uniformity of the tesserae and of the pieces of photo, comprising determining that the values of the color characteristics of the sections are within the previously defined tolerance range, wherein case it is considered a uniform tessera or piece of photo, and otherwise it is considered a tessera or piece of photo with marks, and
   Wherein steps (d)-(g) are computer-implemented steps of a computer program encoded in a computer-readable medium storing non-transitory instructions.

2. The method for making mosaics according to claim 1, characterized in that step b) of analysis of the characteristics of each tessera comprises the following operational steps:
   (a) Dividing each tessera into sections,
   (b) Assigning to each section a color characteristic consisting of the mean of all the components of the color characteristic of the pixels that form it, (c) Calculating the mean of the values of the colour characteristic of all the sections and calculating the greatest and lowest values thereof,
(d) Determining the uniformity of the tesserae to verify that the values of the color characteristics of the sections are within the previously defined tolerance range, wherein case it is considered a uniform tessera, and otherwise it is considered a tessera with marks.

3. The method for making mosaics according to claim 2, characterized in that when it is determined that a tessera is not uniform, the method additionally comprises the following operational steps:
   (a) Analysing the marks of each tessera by comparing the value of the color characteristic of each section with the calculated mean of said color characteristic, producing a so-called "comparative" value, and assigning,
      (i) A mark value "1" to the "comparative" value when the value of the color characteristic of the section plus the predefined tolerance value is smaller than the values of the mean of the tessera,
      (ii) A mark value "2" to the "comparative" value when the value of the color characteristic of the section minus the predefined tolerance value is greater than the values of the mean of the tessera, or
      (iii) A mark value "0" for cases that do not match either of the two aforementioned cases,
   (b) Repeating the previous step to produce a "map of sections" of each tessera,
   (c) Determining the color value of the mark and of the base of the tessera by means of the mean values of the color characteristics of the sections that have the same "comparative" value,
   (d) Determining the shape of the marks by comparing the map of sections with pre-established theoretical models according to the location of the "comparative" values,
   (e) Determining the size of the marks by comparing the map of sections with pre-established theoretical models and within the previously defined tolerance value, and
   (f) Determining the situation of the marks by determining the corner whereto the mark defined by the "comparative" values is closest.

4. The method for making mosaics according to claim 1, characterized in that step d) of analysis of the characteristics of each piece of photo comprises the following operational steps:
   (a) Dividing each piece of photo into sections,
   (b) Assigning to each section a color characteristic consisting of the mean of all the components of the color characteristic of the pixels that it comprises,
   (c) Calculating the mean of the values of the color characteristic of all the sections and calculating the greatest and lowest values thereof,
   (d) Determining the uniformity of the pieces of photo to verify that the values of the color characteristics are within the previously defined tolerance range, wherein case it is considered a uniform piece of photo, and otherwise it is considered a piece of photo with marks.

5. The method for making mosaics, according to claim 4, characterized in that when it is considered that a piece of photo is not uniform, the method additionally comprises the following operational steps:
   (a) Analysing the marks of each piece of photo by comparing the value of the color characteristic of each section with the calculated mean of said color characteristic, producing a so-called "comparative" value, and assigning,
      (i) A mark value "1" to the "comparative" value when the value of the color characteristic of the section plus the predefined tolerance value is smaller than the values of the mean of the piece of photo,
      (ii) A mark value "2" to the "comparative" value when the value of the color characteristic of the section minus the predefined tolerance value is greater than the values of the mean of the piece of photo, or
      (iii) A mark value "0" for cases that do not match either of the two aforementioned cases,
   (b) Repeating the previous step to produce a "map of sections" of each piece of photo,
   (c) Determining the color value of the mark and of the base of each piece of photo by means of the mean values of the colour characteristics of the sections that have the same "comparative" value,
   (d) Determining the shape of the marks by comparing the map of sections with pre-established theoretical models according to the location of the "comparative" values,
   (e) Determining the size of the marks by comparing the map of sections with pre-established theoretical models and within the previously defined tolerance value, and
   (f) Determining the situation of the marks by determining the corner whereto the mark defined by the "comparative" values is closest.

6. The method for making mosaics according to claim 2, characterized in that each tessera or piece of photo is represented by a number of pixels that is a multiple of the number of pixels that define each section.

7. The method for making mosaics according to claim 2, characterized in that the color characteristics correspond with the parameters that identify and differentiate the color.

8. A computer program embodied in a computer-readable medium storing non-transitory instructions and adapted to perform the steps of a method for making mosaics utilizing tesserae, which comprises:
   (a) Preparing the material wherefrom the tesserae that determine the mosaic are to be produced,
   (b) Analysing the available material, by means of a process of optical capturing, determination and recording of the differentiating characteristics of each tessera,
   (c) Storing the analysed characteristics of each tessera in a database of available materials, and the exact storage place of each piece,
   (d) Analysing the characteristics of the image to be reproduced using tesserae, in digital format, said image being divided into fragments or pieces of photo according to the shapes of the available tesserae,
   (e) Storing the analysed characteristics of each piece of photo in a database,
   (f) Comparing the data for each piece of photo whereinto the image is divided with the different tesserae available in the materials database, assigning to each piece of photo a tessera with values that coincide or acceptably coincide within a previously established tolerance range,
   (g) Generating a preliminary image of the final appearance of the mosaic with the tesserae assigned, it optionally being possible to manually modify the design according to the tesserae available in the materials database,
   (h) Automatically assigning the position of each tessera on the working or configuration plane of the mosaic, in addition to previously assigning the place where said tessera is stored, updating the database with regard to the stocks of materials and completed pieces of photo, and (i) Gluing or fixing each of the tesserae that make up the mosaic, wherein analysing steps b) and d) comprise the following operational steps in relation to the tesserae and the pieces of photo, respectively:
  (i) Dividing the captured image of each tessera and each piece of photo into sections,
  (ii) Assigning to each section of the tesserae and of the pieces of photo a color characteristic consisting of the mean of all the components of the color characteristic of the pixels that form it,
  (iii) Calculating the mean of the values of the color characteristic of all the sections and calculating the greatest and lowest values thereof, and
  (iv) Determining the uniformity of the tesserae and of the pieces of photo, comprising determining that the values of the color characteristics of the sections are within the previously defined tolerance range, wherein case it is considered a uniform tessera or piece of photo, and otherwise it is considered a tessera or piece of photo with marks.

9. The method for making mosaics according to claim 4, characterized in that each tessera or piece of photo is represented by a number of pixels that is a multiple of the number of pixels that define each section.

10. The method for making mosaics according to claim 4, characterized in that the color characteristics correspond with the parameters that identify and differentiate the color, such as values R, G and B.

11. The method of claim 7, wherein said parameters comprise R, G and B values.

12. The method of claim 1, wherein said optical capturing process of step (b) comprises use of a camera or an electronic optical scanner.

* * * * *